United States Patent
Threewits

(10) Patent No.: US 9,904,666 B2
(45) Date of Patent: *Feb. 27, 2018

(54) INTERACTIVE ENVIRONMENT FOR PERFORMING ARTS SCRIPTS

(71) Applicant: Randall Lee Threewits, Delray Beach, FL (US)

(72) Inventor: Randall Lee Threewits, Delray Beach, FL (US)

( * ) Notice: Subject to any disclaimer, the term of this patent is extended or adjusted under 35 U.S.C. 154(b) by 484 days.

This patent is subject to a terminal disclaimer.

(21) Appl. No.: 14/530,930

(22) Filed: Nov. 3, 2014

(65) Prior Publication Data
US 2015/0052428 A1    Feb. 19, 2015

Related U.S. Application Data

(63) Continuation of application No. 13/169,867, filed on Jun. 27, 2011, now Pat. No. 8,888,494.
(Continued)

(51) Int. Cl.
*G10L 13/00* (2006.01)
*G10L 15/00* (2013.01)
(Continued)

(52) U.S. Cl.
CPC ............ *G06F 17/24* (2013.01); *G06F 3/0481* (2013.01); *G06F 3/04842* (2013.01);
(Continued)

(58) Field of Classification Search
CPC ....... G10L 13/00; G10L 13/043; G10L 13/08; G10L 15/00; G10L 15/08; G10L 15/01;
(Continued)

(56) References Cited

U.S. PATENT DOCUMENTS 5,920,838 A    7/1999    Mostow et al. .............. 704/255
6,226,615 B1    5/2001    Kirby et al.
(Continued)

FOREIGN PATENT DOCUMENTS

EP    1308956    5/2003
KR    100554397    2/2006
(Continued)

OTHER PUBLICATIONS

ALlday, Peter. Linelearner v2.0. You Tube. May 2010. http://www.youtube.com/watch?v=7L1BwCY_vTo.*
(Continued)

*Primary Examiner* — Paras D Shah
(74) *Attorney, Agent, or Firm* — Fleit Gibbons Gutman Bongini Bianco PL; Jon A. Gibbons

(57) ABSTRACT

One or more embodiments present a script to a user in an interactive script environment. A digital representation of a manuscript is analyzed. This digital representation includes a set of roles and a set of information associated with each role in the set of roles. An active role in the set of roles that is associated with a given user is identified based on the analyzing. At least a portion of the manuscript is presented to the given user via a user interface. The portion includes at least a subset of information in the set of information. Information within the set of information that is associated with the active role is presented in a visually different manner than information within the set of information that is associated with a non-active role, which is a role that is associated with a user other than the given user.

17 Claims, 12 Drawing Sheets

Related U.S. Application Data

(60) Provisional application No. 61/358,961, filed on Jun. 28, 2010.

(51) Int. Cl.
| | |
|---|---|
| *G06F 17/24* | (2006.01) |
| *G09B 19/04* | (2006.01) |
| *G10L 13/04* | (2013.01) |
| *G06F 3/0481* | (2013.01) |
| *G06F 3/0484* | (2013.01) |

(52) U.S. Cl.
CPC .............. *G09B 19/04* (2013.01); *G10L 13/00* (2013.01); *G10L 13/043* (2013.01)

(58) Field of Classification Search
CPC ....... G10L 15/18; G10L 15/26; G10L 15/265; G10L 2013/0008; G10L 2015/00; G10L 2015/08; G10L 2015/22; G10L 2015/221; G10L 2015/225; G10L 2015/228; G06F 17/20; G06F 17/21; G06F 17/24; G06F 17/27; G06F 3/16; A63F 9/24; A63F 13/00; B60R 16/0373; G01C 21/3608; G09B 19/04; H04M 1/271; H04M 3/4936
USPC ....... 704/258, 260, 266, 267, 270, 272, 275, 704/271
See application file for complete search history.

(56) References Cited

U.S. PATENT DOCUMENTS

| | | | | |
|---|---|---|---|---|
| 6,356,867 | B1 | 3/2002 | Gabel et al. ................. | 704/270 |
| 6,728,682 | B2* | 4/2004 | Fasciano ...................... | 704/278 |
| 6,778,252 | B2* | 8/2004 | Moulton et al. ............... | 352/12 |
| 6,956,591 | B2 | 10/2005 | Lundin et al. ............... | 345/684 |
| 7,366,664 | B2 | 4/2008 | Cogliano ...................... | 704/235 |
| 7,478,334 | B2 | 1/2009 | Chen et al. .................. | 715/759 |
| 7,512,537 | B2 | 3/2009 | Pahud et al. ................. | 704/272 |
| 7,523,036 | B2 | 4/2009 | Akabane et al. ............. | 704/260 |
| 8,073,695 | B1* | 12/2011 | Hendricks et al. ........... | 704/260 |
| 8,103,503 | B2 | 1/2012 | Duncan ........................ | 704/251 |
| 8,150,695 | B1* | 4/2012 | Killalea et al. ............... | 704/270 |
| 8,170,878 | B2 | 5/2012 | Liu et al. ...................... | 704/260 |
| 8,326,629 | B2 | 12/2012 | Skuratovsky ................ | 704/260 |
| 8,352,269 | B2 | 1/2013 | Kurzweil et al. ............. | 704/258 |
| 8,447,604 | B1* | 5/2013 | Chang .......................... | 704/235 |
| 8,838,450 | B1* | 9/2014 | Killalea ................ | G06Q 30/04 |
| | | | | 704/258 |
| 2003/0028380 | A1 | 2/2003 | Freeland et al. ............. | 704/260 |
| 2003/0200858 | A1 | 10/2003 | Xie | |
| 2005/0022125 | A1 | 1/2005 | Powell | |
| 2008/0140413 | A1* | 6/2008 | Millman et al. ............. | 704/270 |
| 2009/0024963 | A1 | 1/2009 | Lindley et al. | |
| 2009/0119108 | A1 | 5/2009 | Noh et al. ...................... | 704/260 |
| 2009/0254345 | A1 | 10/2009 | Fleizach et al. ............. | 704/260 |
| 2009/0326948 | A1* | 12/2009 | Agarwal et al. ............. | 704/260 |
| 2010/0009322 | A1 | 1/2010 | Da Silva Rocha ........... | 434/160 |
| 2010/0118034 | A1* | 5/2010 | Kim ........................ | G06F 17/24 |
| | | | | 345/473 |
| 2010/0216108 | A1* | 8/2010 | Cooperman et al. ......... | 434/317 |
| 2010/0318364 | A1* | 12/2010 | Kurzweil et al. ............. | 704/260 |
| 2011/0040555 | A1* | 2/2011 | Wegner et al. ................ | 704/9 |
| 2011/0124264 | A1* | 5/2011 | Garbos ......................... | 446/147 |
| 2011/0135278 | A1* | 6/2011 | Klappert ................ | G06F 17/241 |
| | | | | 386/278 |
| 2011/0239107 | A1* | 9/2011 | Phillips et al. ............... | 715/234 |
| 2011/0239119 | A1* | 9/2011 | Phillips et al. ............... | 715/731 |
| 2011/0296332 | A1* | 12/2011 | Whiting ................. | G06Q 10/00 |
| | | | | 715/771 |
| 2011/0307527 | A1* | 12/2011 | Roenning ......... | G06F 17/30041 |
| | | | | 707/803 |
| 2011/0320198 | A1 | 12/2011 | Threewits | |
| 2012/0081530 | A1 | 4/2012 | Kerr et al. ...................... | 348/61 |
| 2012/0311448 | A1 | 12/2012 | Achour et al. | |

FOREIGN PATENT DOCUMENTS

| | | |
|---|---|---|
| KR | 1020110062738 | 6/2011 |
| WO | 03096323 | 11/2003 |

OTHER PUBLICATIONS

Croker, Warner. Rehearsal: An iPhone App to Help Actors Learn Lines. GottaBe Mobile. Feb. 2010. http://www.gottabemobile.com/2010/02/28/rehearsal-an-iphone-app-to-help-actors-learn-lines/.*

Rehearsal,theApp. Feb. 2010. https://web.archive.org/web/20100222065600/http://www.rehearsaltheapp.com/about.*

Sinclair, Stéfan, et al. "Digital scripts on a virtual stage: the design of new online tools for drama students." Proceedings of the Fifth IASTED International Conference on Web-Based Education. 2006.*

Miller, Bruce. "lines." (1992).*

International Search Report and Written Opinion dated Feb. 27, 2012 for International Application No. PCT/US2011/042027.

Internet Data: Http://itunes.apple.com/kr/app//id406604588?mt=8 (Woongjin Thinkbig, Inc.) dated Dec. 23, 2010.

International Search Report & Written Opinion dated Jul. 16, 2014 received for PCT Application No. PCT/US2014/018952.

* cited by examiner

THERE GOES THE BRIDE 51

ACT TWO

*The scene is the same—The action is continuous.*

URSULA *(edges her way to the door)*: I'll be two minutes at the most. Er—*(Then brightly)* You wouldn't like to go on ahead would you, with my father?
BABCOCK: No chance.
URSULA: No. Jolly good, quite right, let's all go together eh?
BABCOCK: Too true.
URSULA: Yes, just one big happy family.
*She laughs gaily and exits.*
GERALD: I don't know what she's got to be so cheerful about, I'm sure. By the way I want to apologise for calling you Babcock, Mr. Alcock. I don't know what on earth made me think of it. I mean it's not as if I've ever known anyone called Babcock. Can I give you a small refill?
BABCOCK: No. Make it a large one.
GERALD *(gets Champagne)*: Large one coming up, sir. I mean it's such a damn silly name isn't it? *(Pours the Champagne)* Babcock, eh. That reminds me, we had a boy at school called Haddock. We used to call him fish-face. *(He chuckles, then stops)* No I'm wrong, that was Salmon. Well Cheers.
BABCOCK *(Flatly)*: Cheers.
*They drink.*
GERALD: It's a funny thing about names, Mr. Pollock.

*He sits down beside MR. BABCOCK and accidentally squashes BABCOCK'S top hat. BABCOCK closes his eyes in anguish, but GERALD oblivious of what he's done carries on regardless.*

It's never been my strong suit, you know. Even when I was in practice I couldn't tell one patient from another. I remember once we had a Mrs. Shufflebotham in the surgery. Now you wouldn't think you could forget a name like Shufflebotham, would you? Well, there she was, sitting in the surgery, and I said to her—
BABCOCK: Would you mind standing up.
GERALD: No, nothing like that, no. What I said was—
BABCOCK *(still controlling his rage)*: You're sitting on my hat.
GERALD: No, I said nothing of the sort. Sitting on my hat, indeed. No, what I said was . . . —*(Suddenly)* Oh. *(Gets up)* I'm so sorry. I do beg your pardon—
*He rises and picks up the dented top hat. As he and BABCOCK stare at it there is a sound of banging coming from upstairs.*
BABCOCK: What's that?
DAPHNE *enters.*
DAPHNE: Gerald, you must come at once. I think Ursula's going to kill—*(She suddenly sees BABCOCK)* Oh! *(gushingily to BABCOCK)*

FIG. 2

INTERACTIVE ENVIRONMENT FOR PERFORMING ARTS SCRIPTS

CROSS-REFERENCE TO RELATED APPLICATION

This application is based upon and claims priority to U.S. patent application Ser. No. 13/169,867 filed Jun. 27, 2011, now U.S. Pat. No. 8,888,494, which is based upon and claims priority to U.S. Provisional Patent Application Ser. No. 61/358,961 filed Jun. 28, 2010 the disclosure of each is hereby incorporated by reference in their entireties.

FIELD OF THE INVENTION

The present invention generally relates to interactive environments, and more particularly relates to an interactive environment for performing arts scripts.

COPYRIGHT NOTICE

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

A basic task performed by an actor is learning/reviewing the lines for the role that he/she is performing or auditioning for. Although there is no single approach to accomplish this, there are many common approaches and steps. Unfortunately, many of these approaches and steps can be very tedious and inefficient. This can result in the learning/reviewing process becoming less effective and enjoyable for the actor.

SUMMARY OF THE INVENTION

In one embodiment, a method for presenting a script to a user is disclosed. The method comprises analyzing a digital representation of a manuscript. This digital representation comprises a set of roles and a set of information associated with each role in the set of roles. An active role in the set of roles that is associated with a given user is identified based on the analyzing. At least a portion of the manuscript is presented to the given user via a user interface. The portion comprises at least a subset of information in the set of information. Information within the set of information that is associated with the active role is presented in a visually different manner than information within the set of information that is associated with a non-active role, which is a role that is associated with a user other than the given user.

In another embodiment, an electronic device for presenting a script to a user is disclosed. The electronic device comprises memory and a processor that is communicatively coupled to the memory. An interactive script environment is communicatively coupled to the memory and the processor. The interactive script environment is configured to perform a method. The method comprises analyzing a digital representation of a manuscript. This digital representation comprises a set of roles and a set of information associated with each role in the set of roles. An active role in the set of roles that is associated with a given user is identified based on the analyzing. At least a portion of the manuscript is presented to the given user via a user interface. The portion comprises at least a subset of information in the set of information. Information within the set of information that is associated with the active role is presented in a visually different manner than information within the set of information that is associated with a non-active role, which is a role that is associated with a user other than the given user.

In yet another embodiment, a computer program product for presenting a script to a user is disclosed. The computer program product comprises a storage medium readable by a processing circuit and storing instructions for execution by the processing circuit for performing a method. The method comprises analyzing a digital representation of a manuscript. This digital representation comprises a set of roles and a set of information associated with each role in the set of roles. An active role in the set of roles that is associated with a given user is identified based on the analyzing. At least a portion of the manuscript is presented to the given user via a user interface. The portion comprises at least a subset of information in the set of information. Information within the set of information that is associated with the active role is presented in a visually different manner than information within the set of information that is associated with a non-active role, which is a role that is associated with a user other than the given user.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 shows one example of a page from a performing arts script;

DETAILED DESCRIPTION

Figure 1:
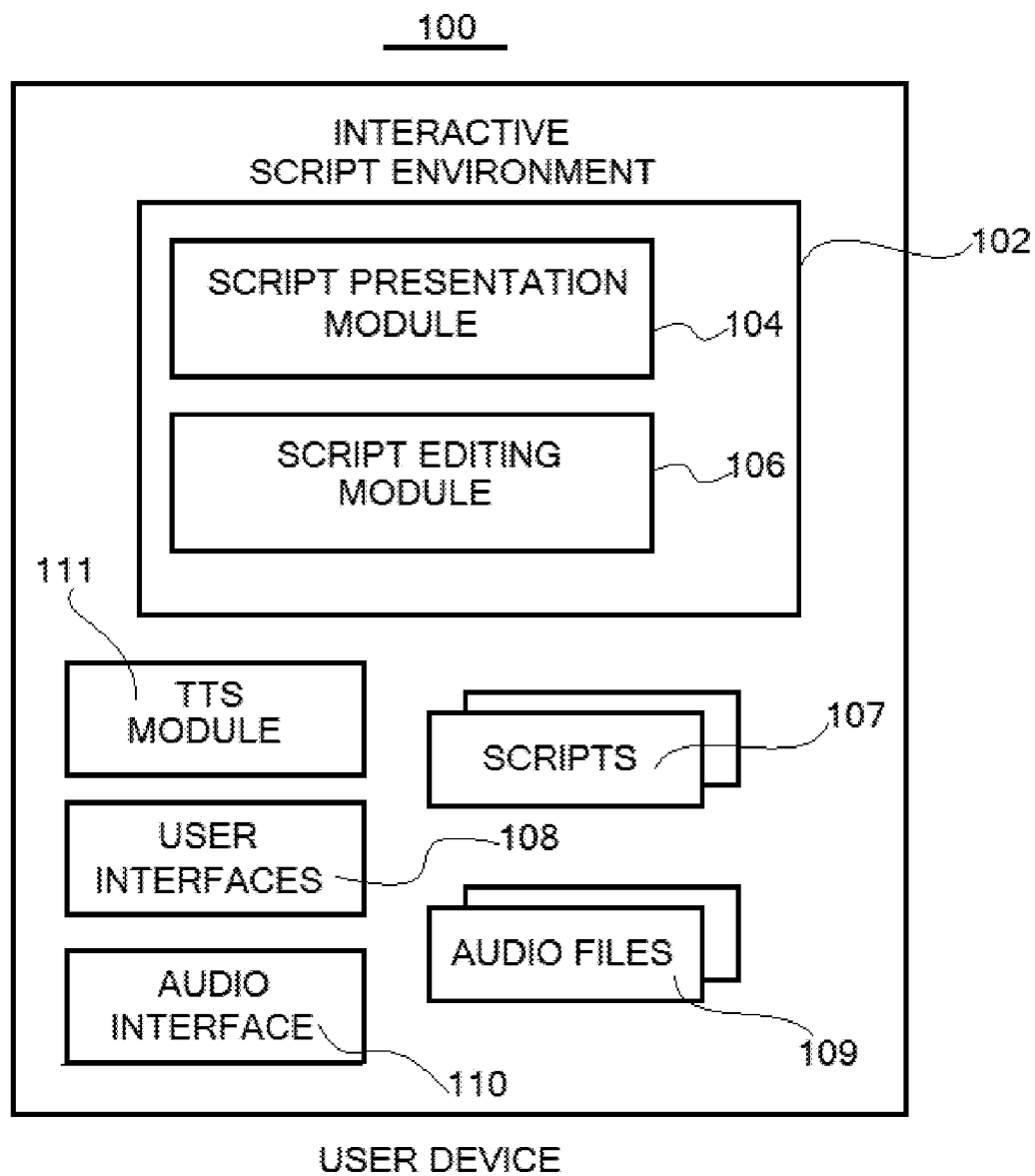
FIG. 1 shows one example of an operating environment according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term "electronic device" is intended to broadly cover many different types of electronic devices. For example, and not for any limitation, an electronic device can include any one or a combination of the following: a wireless communication device, a laptop computer, notebook computer, personal computer, Personal Digital Assistant, reading devices, tablets, gaming units, and other electronic devices capable of presenting information to a user via visual, audible, and/or tactile mechanisms.

Conventionally, an actor usually needs to identify his/her lines from the various lines in a manuscript (script). This is sometimes performed by taking a paper version of the script and using a see-through marking device to highlight their lines. From this the actor will familiarize himself/herself with the script dialogue and work on learning the lines. As a part of the learning process, the actor needs to read the lines that are not his/hers, and to also not see his/her lines as well. This is typically accomplished by covering the entire dialogue with another piece of paper and then sliding the sheet down without revealing his/her dialogue to see if he/she knows the next line. The actor then continues to move the paper down revealing the next set of dialogue. Once the actor feels that the script has been learned, the actor will often times enlist the aid of another person to read the lines that are not the actor's and provide feedback. More often than not this is completed prior to the first rehearsal.

Once rehearsal begins, there are usually changes and enhancements to the script. The changes take the form of deleted lines, added lines and changed lines. Also, the actor will often mark "blocking" instructions in the script. "Blocking" is movement that an actor needs to perform such as "Move to left of stage", "Pick up Drink", and is typically not a part of the script as initially written. The actor usually marks these changes and enhancements back into the script.

As discussed above, these conventional methods for learning/reviewing lines and other information in a script can be very tedious and inefficient. This can result in the learning/reviewing process becoming less effective and enjoyable for the actor. Therefore, one or more embodiments of the present invention advantageously provide an interactive script environment that assists an actor in the various aspects of learning/reviewing his/her lines in a script. The interactive script environment also allows an actor to keep track of changes and enhancements to these scripts. Through this environment one or more scripts are presented to a user. Various aspects of the script are rendered (visually and/or with sound) in unique formats to help the actor easily identify them. The presentation of these aspects are highly customizable, but, in one embodiment, default to the most common usage, or expected usage.

The actor/user can select any of the roles of the script and have that role designated as the active role of the script for the learning/review process. The user can set a bookmark on any of the lines in the script and be able to quickly jump to any of the bookmarked lines. The user can also have the lines presented to him/her in an audible format by either recording the lines into a user device, downloading/transferring prerecorded audio files, and/or using text-to-speech technology to speak the lines. When using text-to-speech capabilities, the user can assign a different voice to each role.

The user can create and edit the script on a user device comprising the interactive script environment. Alternatively, the user can create and edit the script on an internet web site, remote system, and/or cloud computing environment and have the resultant script downloaded to the user device. Additionally, changes the user makes to the script on the computing device can be uploaded and stored on the internet web-site, remote system, cloud computing environment, etc.

Other aspects and advantages of the invention will become apparent from the following detailed discussion taken in conjunction with the accompanying drawings which illustrate, by way of example, various embodiments of the present invention.

Operating Environment

FIG. 1 is a block diagram illustrating one example of an operating environment for assisting an actor with the various aspects of learning/reviewing his/her lines in a script and also in keeping track of the changes and enhancements to these scripts as well. It should be noted that although the following discussion is with respect to actors and performing arts scripts, one or more embodiments of the present invention are applicable to other types of individuals and information mediums such as, but not limited to, musicians and lyric sheets.

In particular, FIG. 1 shows an electronic device 100, herein referred to as the "user device 100". It should be noted that throughout the following discussion the terms "user" and "actor" are used interchangeably unless otherwise noted. The user device 100 can be any electronic device such as a wireless communication device, a laptop computer, notebook computer, personal computer, Personal Digital Assistant, reading devices, tablets, gaming units, and other electronic devices capable of presenting information to a user via visual, audible, and/or tactile mechanisms.

The user device 100, in one embodiment, comprises an interactive script environment 102 that allows a user to manage and interact with one or more scripts by, for example, reviewing components of the script, editing the script, annotating the script, and the like. The term "script" or "scripts" as used herein, indicate a representation (printed or digital) of an actor's (or actors') lines and stage directions that are used as the basis of implementing a performing arts event such as (but not limited to) a staged play, television program, movie, commercial, or the like.

The interactive script environment 102, in one embodiment, comprises one or more selectable components that perform appropriate responses. It should be noted that throughout this discussion, any of the selectable components can be selected by one or more mechanisms such as, but not limited to, voice recognition, contact selection (e.g., with a stylus), and the like. The interactive script environment 102 further comprises a script presentation module 104, a script editing module 106, one or more scripts 107, optionally one or more audio files 109, and a text-to-speech (TTS) module 111. The script presentation module 104 renders/presents a digital representation of a script to a user via a user interface 108, such as a display, of the user device 100. As will be discussed further below, a script 107 can be presented to a user in various formats that assist in learning/reviewing the script 107. As the process of creating the performing art event progresses, the script 107 can be modified/revised many times. Therefore, the script editing module 106 allows the user to change, add, and remove lines from the script 107 as needed. In addition, the script editing module 106 also allows the user to add annotations, images, video, and the like to the script 107.

The audio files 109, in one embodiment, are each associated with one or more dialogue lines in the script 107. The audio files 109 are utilized by the script presentation module 104 to audibly present corresponding dialogue lines in the script 107. The user is able to create and play the audio files 109 through an audio interface 110 of the user device 100. It should be noted that the user can also download or transfer these audio files 109 to the user device 100.

The script editing module 106 further allows the user to link these audio recordings to their associated lines in the script 107 so that when the user reaches the given line(s) in script 107 the associated audio recording is either automatically played or manually played. In another embodiment, the interactive script environment 102 can monitor, via the audio interface 110, a user's reading of his/her lines and detect when another actor's lines should be read. The script presentation module 104 then automatically plays, via the audio interface 110, the audio file 109 associated with the other actor's line(s). This simulates a reading environment comprising other actors.

The script 107, in one embodiment, can be digitally stored on the user device 100 in memory such as, but not limited to, volatile and/or non-volatile memory. It should be noted that the script 107, audio files 109, and/or modifications/revisions/annotations to the script 107 can be stored remotely from the user device 100 as well. For example, the interactive script environment 102 can render/present a script to a user that is stored remotely from the user device 100 on, for example, the user's personal computer, in a cloud computing environment, on a remote server, or the like. The user can also purchase scripts 107 or otherwise obtain digital scripts and download them to the user device 100.

In addition, the functions/operations performed by the interactive script environment 102 discussed herein can also be provided by a remote system such as, but not limited to, a cloud computing system. In this embodiment, the interactive script environment 102 is an interface such as a browser, mashup, and/or an application that allows the user to interact with the remote system for performing the functions/operations discussed herein.

One advantage of the interactive script environment 102 is that it enhances the learning/reviewing process of a script. For example, the interactive script environment 102 allows a user to easily identify his/her lines. The interactive script environment 102 can also presents the script 107 in a way that hides the user's lines from view while displaying the other lines of the script. The user can easily work on a small segment of the script by using navigation facilities such as bookmarks, next, and previous lines. The interactive script environment 102 reduces the need for a second person by using the audio and text-to-speech capabilities. These and other aspects of the interactive script environment 102 give the user more time to study the script 107. When implemented on a portable device, such a smartphone or tablet, the user can study the script during any idle time such as waiting in line.

FIG. 2 shows a sample page 200 from a hardcopy script, typical of that used in the performing arts industry. FIG. 2 further identifies examples of components that are emulated in the script presentation module 104. As can be seen, the page 200 comprises a set of information such as, but not limited to, dialogue lines, stage directions, etc. that are associated with each role. In the example of FIG. 2, this set of information is displayed as text. However, other methods of displaying this information can be used as well.

One or more lines in a script 107 can be classified into a category. Examples of various categories are Scene 202, Dialogue 204, and Stage Directions 206. A Scene 202 line type indicates the beginning of a new scene or act. The Dialogue 204 line type represents words that are spoken by the actor. The Stage Directions 206 line type is information that describes what should be happening beyond just the spoken word, such as, but not limited to, what the stage looks like, where actors should be positioned, what the lighting should be, how lines should be interpreted, what props are used, etc. This information is generally not spoken by an actor. The stage directions are typically indented and in italics to help differentiate them from dialogue lines. Any single one of these line types (or categories) 202, 204 or 206 can be considered one line regardless of the number of sentences that item may include.

With respect to dialogue lines 204, there is an indication of what role 208 is speaking the line. For example, FIG. 2 shows that the role of "BABCOCK" is speaking the line that includes the dialogue "Too True.". In addition, there are sometimes stage directions 210 embedded within a dialogue line. The accepted indication of an embedded direction is that they are enclosed in parentheses and italicized. For example, FIG. 2 shows a stage direction of "(Flatly)" that is enclosed in parentheses and italicized. However, other methods can be used to identify stage directions as well.

Figure 3:
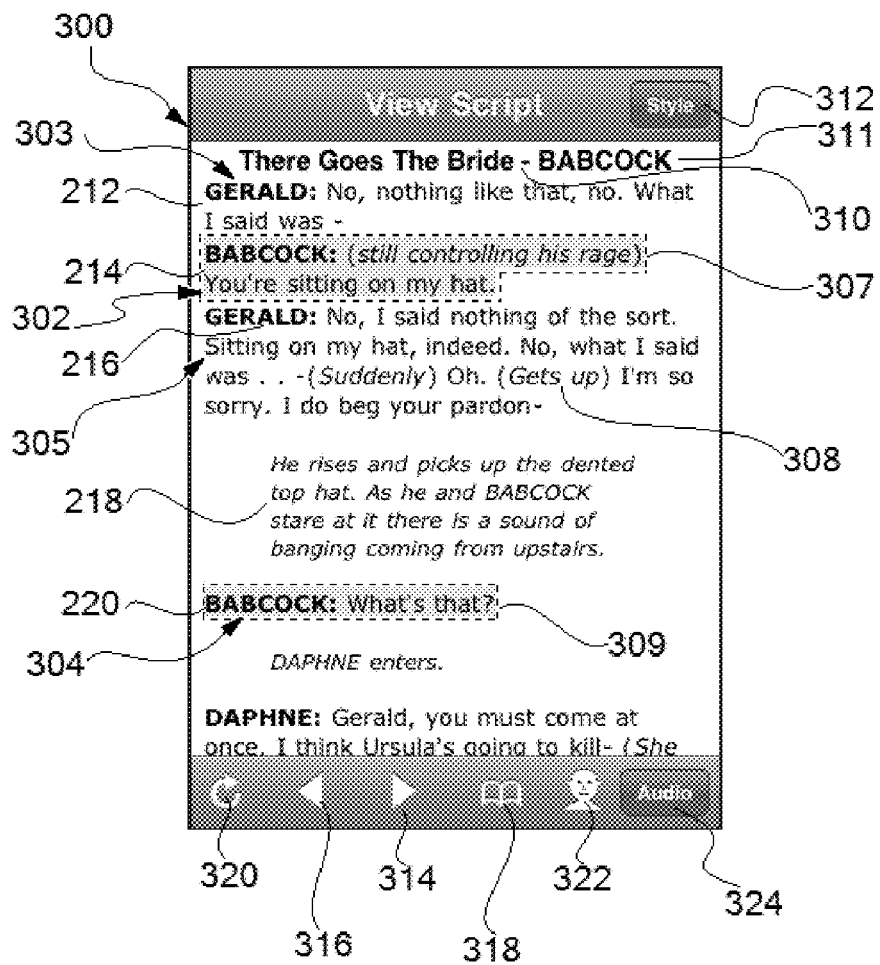
FIG. 3 shows one example of an interactive Script environment according to one embodiment of the present invention.

FIGS. 3-8 illustrate various examples of a user interacting with the interactive script environment 102 using the sample script page 200 of FIG. 2. The lines of the script that are presented to the user in FIGS. 3-8 are collectively identified in FIG. 2 as group 226. Also for exemplary purposes only, the active role for this user is considered to be BABCOCK. The lines identified in group 226 are broken down to their basic lines as follows:

212—Dialogue line
214—Dialogue line for active role BABCOCK
216—Dialogue line
218—Stage Directions
220—Dialogue line for active role BABCOCK
222—Stage Directions
224—Dialogue line After the user has initiated the interactive script environment 102 and selected a given script 107, the script 107 is presented to the user in a primary window 300 via the script presentation module 104. It should be noted that the script 107 can be automatically displayed to the user without requiring the user to manually select the script 107. The primary window 300, in one embodiment, is the main window of the interactive script environment 102 that is utilized by the user for learning/reviewing the script 107. As can be seen in FIG. 3, the window 300 displays at least a portion of a page of the script 107.

The script presentation module 104 presents dialogue lines 214, 220 associated with the active role (BABCOCK in this example) in one or more regions 302, 304 of the window 300 and presents dialogue lines 212, 216 associated with the non-active roles (e.g., GERALD) in one or more other regions 303, 305. The script presentation module 104, in one embodiment, presents active role dialogue lines 214, 220 to the user in a visually different manner than non-active role lines 212, 216. FIG. 3 shows one example where the active role dialogue lines 214, 220 are highlighted (as indicated by the dashed boxes 307, 309) and the non-active role dialogue lines 212, 216 are not highlighted. For example, the active role dialogue lines 214, 220 can be highlighted with a yellow background, while the non-active dialogue lines 212, 216 have a white background. However, any type of visual mechanism can be used to distinguish active role dialogue lines 214, 220 from non-active role dialogue lines 212, 216. It should be noted that the user is able to select the active role and/or non-active roles through the interactive script environment 102. Also, to help more easily identify dialogue lines the script presentation module 104 can further visually alter the dialogue lines. For example, FIG. 3 shows that for each dialogue line 212, 214, 216, 220 the role (e.g., BABCOCK and GERALD) have been presented in a bold font. However, any type of visual mechanism can be used to distinguish dialogue lines from other types of lines.

The script presentation module 104 also presents stage direction lines 218 to the user in one or more additional regions 306 of the window 300. In one embodiment, the stage direction lines 218 are indented and italicized to substantially represent industry accepted standards for stage directions. With respect to embedded stage directions 308 for a given dialogue line 216, the script presentation module 104 presents these stage directions 308 in an italicized font as is standard practice for hard-copy scripts. However, any type of visual mechanism can be used to identify embedded stage directions. The script presentation module 104 can also display the name/title of the currently displayed script in yet another region 310 of the window 300. In one embodiment, the current active role 311 can also be displayed in this region 310 or another region as well.

The following are additional examples of various aspects of a script 107 that can be presented to a user through the interactive script environment along with presentation characteristics to help a user identify one type of displayed information from another. Lines for the role that pertains to the user can be displayed, for example, with a black foreground/yellow background. Lines for roles that do not pertain to the user can be displayed, for example, with a black foreground/White background. A role name can be displayed, for example, in bold font. Script information that is not dialogue, such as stage directions, can be displayed, for example, with italicized and indented font. Stage directions that are embedded within dialogue in a script, which are usually surrounded by parentheses, can be displayed, for example, with italicized font. Dialogue that is spoken simultaneously with another role can be displayed, for example, with a red foreground. Long runs of dialogue that are spoken in parallel with another actor can be displayed, for example, with each run in a unique foreground color. Sung dialogue can be displayed, for example, with uppercase and bolded font.

The script 107 can be presented to the user in a variety of approaches through which the user can move forward and backward through the script 107. For example, the script presentation module 104 can present the script is various different modes such as a Scene mode, Role mode, Script mode, Line mode, Redacted mode, and the like. FIG. 3 shows the script 107 being displayed in Scene mode where all lines for a given scene are rendered in the window regardless of the type of the line. This allows the user to view the lines a scene at a time. Each scene is presented to the use on a separate scrollable page. In the Role mode all lines for one or more roles are presented to the user. Lines are divided into groups: a) lines that are for the active role and b) all other lines. This mode alternatively shows in a window all contiguous lines for the active role (a) and then renders all contiguous other lines (b). This alternating sequence is repeated for the entire script. In the Script mode the entire script is rendered and presented to the user. In the Line mode each line of the script is rendered by itself in a window and the user can view the lines a single line at a time. In the Redacted mode one or more lines of text are redacted or hidden from the user. The user can select which line to redact either based on type or custom selection of lines. For example, this mode can be similar to the Scene mode except that the words for the lines of the active role cannot be read. It should be noted that the interactive script environment 102 can include other rendering/presentation modes as well. The user is able to select a rendering/presentation mode via an on-screen widget such as a Style icon/button 312, as shown in FIG. 3.

Figure 4:
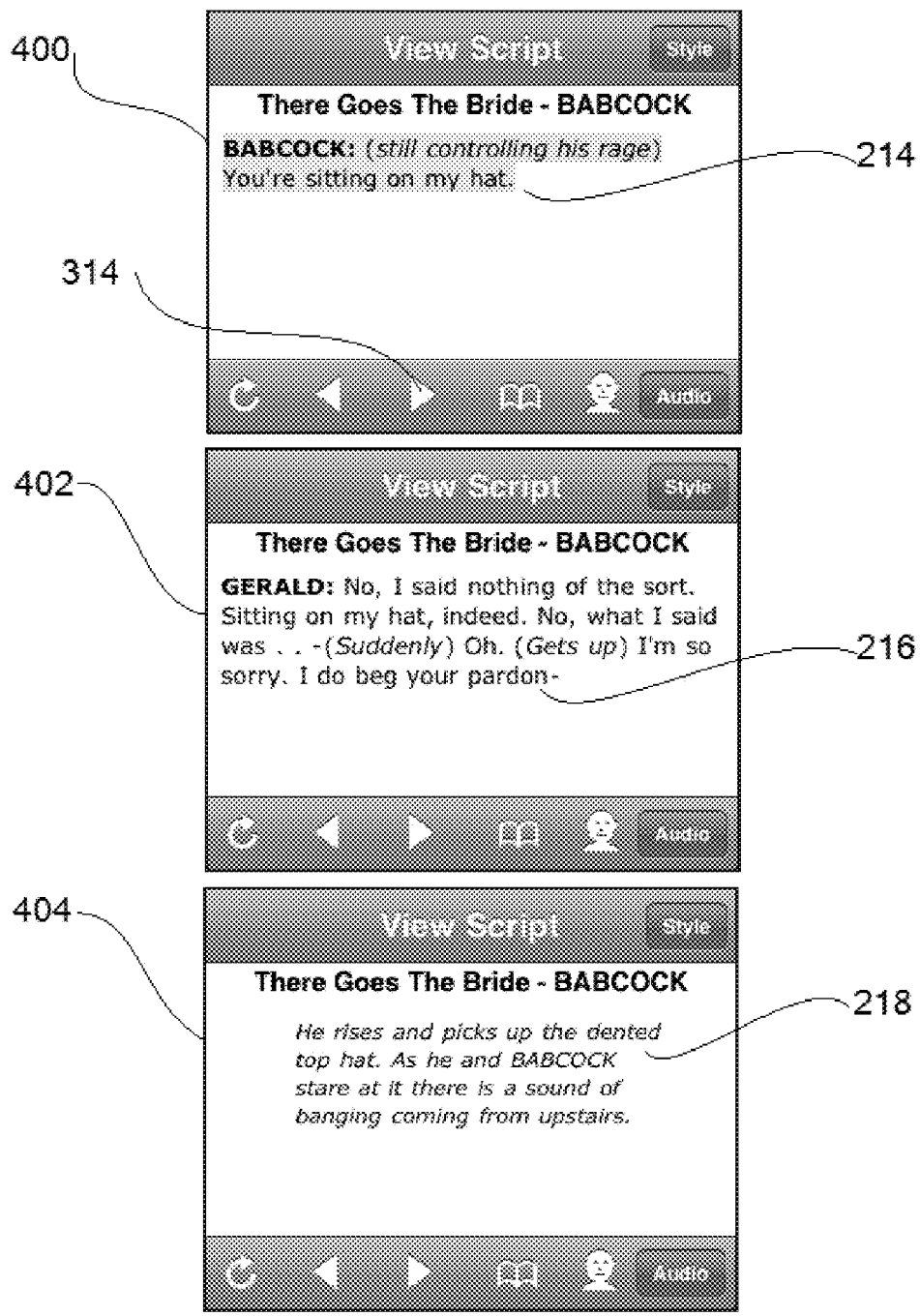
FIG. 4 illustrates one example of presenting a script in a Line mode in the interactive script environment of FIG. 1 according to one embodiment of the present invention.

FIG. 4 shows the script 107 being displayed in the Line mode. For example, the first window 400 shows a line 214 from the sample script 200 in FIG. 2. When the Next icon 314 (FIG. 3) is selected the window 400 is updated with the next line 216 in the script 107, as shown in updated window 402. A subsequent selection of the Next icon 314 results in the next line 218 of the script 107 after line 216 being displayed, as shown in updated window 404.

Figure 5:
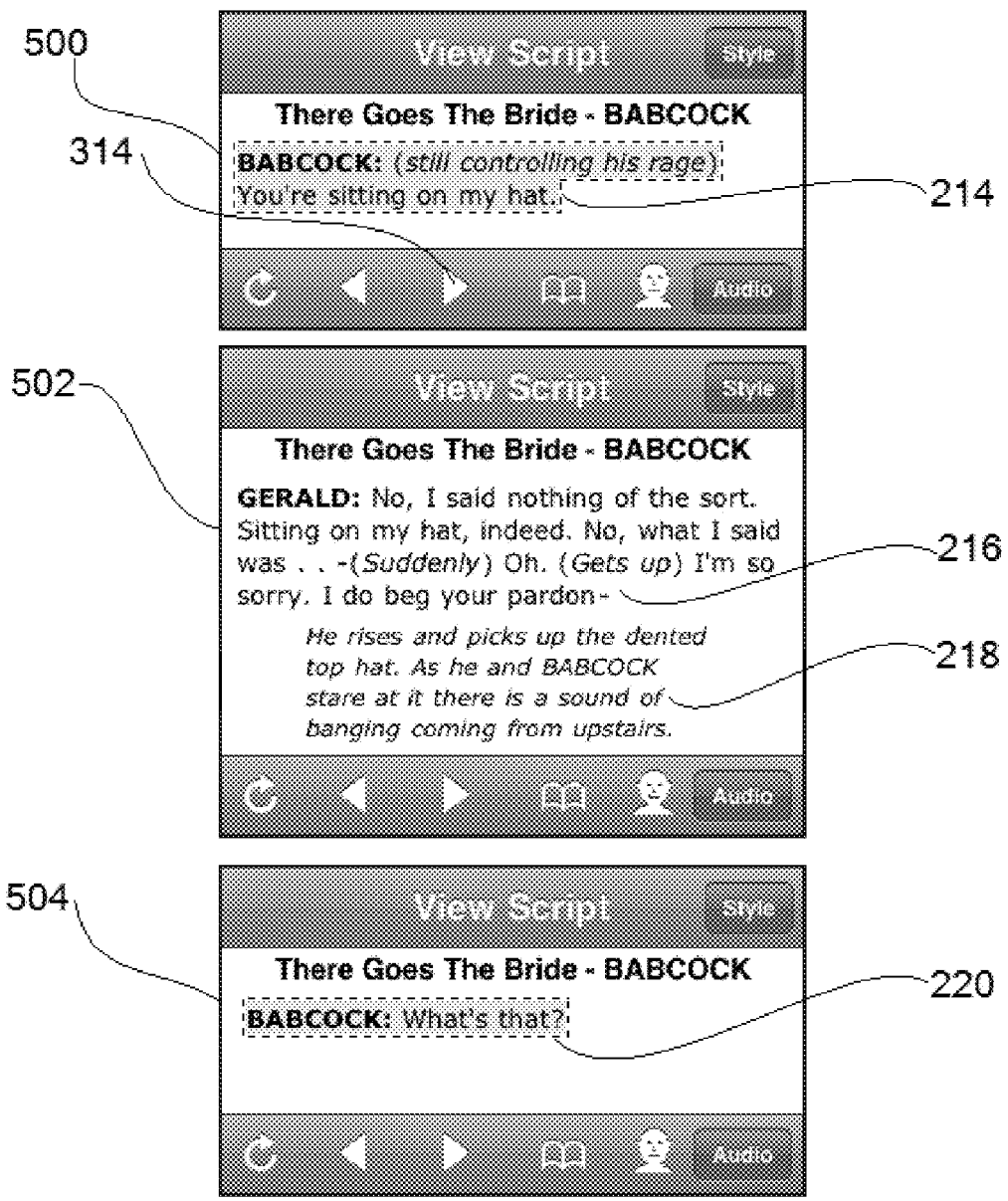
FIG. 5 illustrates one example of presenting a script in a Role mode in the interactive script environment of FIG. 1 according to one embodiment of the present invention.
Figure 6:
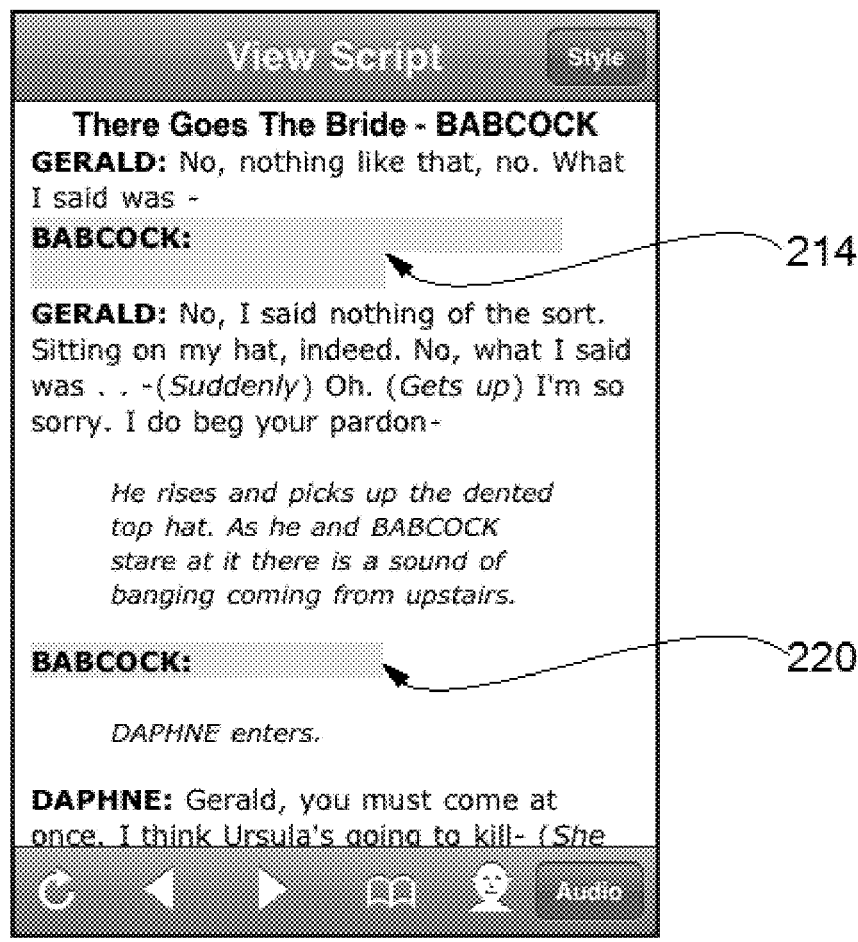
FIG. 6 illustrates one example of presenting a script in a Redacted mode in the interactive script environment of FIG. 1 according to one embodiment of the present invention.

FIG. 5 shows the script 107 being displayed in the Role mode, where the active role is BABCOCK. For example, the first window 500 shows a line 214 from the script 107 that is associated with the active role BABCOCK When the Next icon 314 is selected the window 500 is updated with non-active role lines 216 218, as shown in updated window 502. Two lines are rendered since the next BABCOCK line is not until 220. This window 502, in general, can include all lines up till the next BABCOCK line. A subsequent selection of the Next icon 314 results in the next line 220 of the script 107 being displayed, as shown in updated window 504. FIG. 6 shows the script 107 being displayed in the Redacted mode, where the active role is BABCOCK. As can be seen, the dialogue lines 214, 220 for BABCOCK are shown as a placeholder but the text is not rendered.

Returning to FIG. 3, the user has many options for viewing the lines of a script through the interactive script environment 102. For example, to view additional lines that are out-of-view in the window, the user is able to use a pointing device such as a mouse, stylus, or finger to scroll the lines up, down, left, and/or right, which brings new lines (or previous lines) into view. The user can also use the pointing device (or on-screen widgets) to zoom into or out of the script 107. The interactive script environment 102 can also present various widgets to the user such as a "Next" or "Previous" icon. Upon selection of the Next icon 314, the window 300 is refreshed to show the next logical grouping of lines as is appropriate for the current viewing mode. Similarly, upon selection of the Previous icon 316, the window 300 is refreshed with the previous logical grouping of lines as is appropriate for the current viewing mode.

Another icon that can be presented to the user is a "Bookmark" icon 318. The Bookmark icon 318 allows the user to place bookmarks anyplace in the script 107. For example, upon selection of the Bookmark icon 318 a new window is presented to the user that comprises a list of bookmarks that user can select. A few examples of bookmarks are "BABCOCK Entrance 1", "BABCOCK Entrance 2", "Act 1, Scene 2", "GERALD sits on hat", etc. When the user selects one of these bookmarks, the window 300 is refreshed with the appropriate grouping of lines where the first line rendered is the line indicated by the selected bookmark.

Yet another icon is a "Previous Bookmark" icon 320. When this icon is selected the window 300 is refreshed to present the same information that was displayed based on the previous bookmark being selected by the user. This makes it very convenient for the user to work on a specific section of the script 107. A "Role" icon 322 can also be displayed to the user. When the Role icon 322 is selected, a selection window is displayed that allows the user to select any of the roles in the script and make that role(s) the active role(s). Alternatively, the user can select non-active roles as well. When the user selects an active role or designates the non-active roles, the window 300 is refreshed to show the lines appropriate for the new active role(s).

It should be noted that a "Search" icon (not shown) can also be presented to the user as well. When this icon is selected the user is able to enter one or more search terms or categories into a search box (not shown). For example, the user can search for a specific word or phrase, particular lines associated with a given role, lines associated with a given scene or act, lines with embedded stage directions, lines annotated by the user, etc. This allows the user to easily and efficiently find information with the script.

Figure 7:
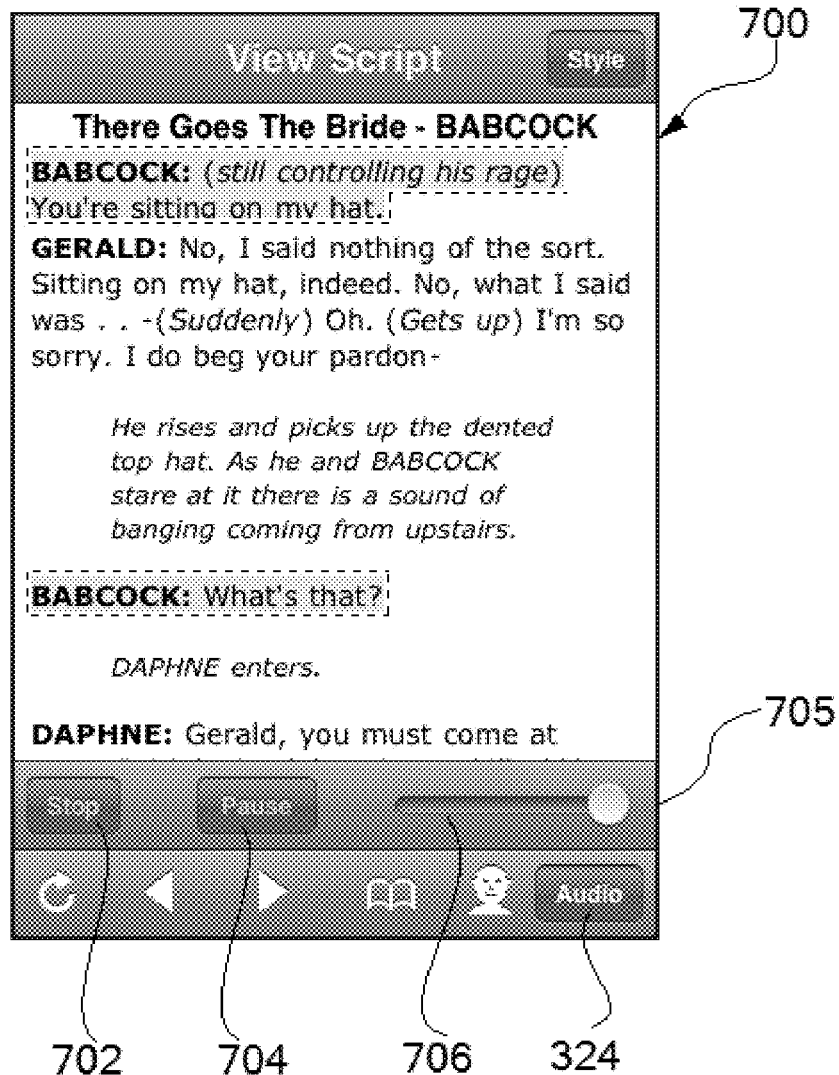
FIG. 7 shows an interactive script environment presenting audio options to a user according to one embodiment of the present invention.

FIG. 3 also shows an "Audio" icon 324. When selected, the interactive scripting environment 102 displays (or hides) audio options within a region 705 of the window 700, as shown in FIG. 7. For example, when the user selects the Audio icon 324, in one embodiment, the region 705 is displayed along with the various icons such as start/stop icon 702, a pause 704, and a volume icon 706 shown therein. When the Audio icon 324 is selected again this region 705 along with these icons 702, 704, 706 disappear. It should be noted that the region 705 can remain, but while the icons 702, 704, 706 disappear.

With these audio options the user has the capability of recording audio related to dialogue lines, and use those recordings in addition to (or in replacement of) having the text appear on the window. Alternatively, audio files 109 associated with a given role or given lines of dialogue can be downloaded and/or stored on the user device 100 for use by the interactive script environment 102, as discussed above. Even further, instead of using audio files 109, the interactive script environment 102 can utilize the TTS module 111 to audibly present a given set of dialogue to the user.

In one embodiment, the user is able to record his/her voice as he/she reads a given line(s) of dialogue. This allows a user to capture his/her "performance" of one or more lines of dialogue for review. The user is able to start, stop, and/or pause a recording process or a playback process utilizing one or more associated widgets 702, 704. For example, an icon 702 can be displayed to the user that allows the user to either start/stop a recording process or play/stop playback of an audio file 109. A pause icon 704 allows the user to pause a recording process or the playback of an audio file 109. A volume widget 706 allows the user to control the output level of the audio. For example, the user can slide the icon 706 to the left or right to increase or decrease the volume. The above icons 702, 704, 706 and their operations are also applicable to controlling TTS playback of lines of dialogue as well.

In one embodiment, the user is able to select a given set of dialogue lines and have the corresponding audio file 109 played through the audio interface 110 (e.g., speaker). This selection can be performed by selecting the set of dialogue lines directly on the user interface 108 (e.g., display). This selection can be performed utilizing a pointing device, navigating to the set of dialogue lines via a mechanical or on-screen navigation device, and/or the like. Once a selection is made, the corresponding audio file 109 can be automatically played or manually played as a result of the user pressing the play icon 702. This allows the user to read his/her line then have another actor's lines audibly presented using the corresponding audio file 109 as if an actual human is there reading with the user. This provides the user with a more realistic learning/reviewing experience.

If TTS is used to playback a set of dialogue lines, the TTS module 111 can play either non-active role dialogue lines or active role dialogue lines depending on the current settings of the interactive script environment 102. When presenting dialogue lines with TTS, the TTS module 111 is able to identify embedded stage directions and prevent these lines from being synthesized into speech. The TTS module can include multiple voices that the user can associate with different roles. This allows the TTS module 111 to play back the lines with the voice associated for that particular role.

In another embodiment, the interactive scripting environment 102 monitors a user's reading of dialogue lines and automatically plays (or automatically converts dialogue lines via TTS) an audio file 109 associated with a given set of dialogue lines. For example, as the user reads his/her dialogue line 214 "You're sitting on my hat." the script presentation module 104 monitors this reading through the audio interface 110, which comprises a microphone. The script presentation module 104 analyzes the incoming audio representing the user's voice and identifies the location within the script 107 where the user is currently reading or reciting. For example, the script presentation module 104 can identify the words being spoken by the user and match those words to the words in the script 107. This allows the script presentation module 104 to identify the location in the script 107 at which the user is currently reading or reciting. It should be noted that other methods for determining a location within the script 107 can also be used.

Based on this analyzing, the script presentation module 104 is able to detect when the user has completed his/her line and automatically play the corresponding dialogue of another actor. Once the audio from the other actor's lines is played the user is able to read/recite his/her next line. The script presentation module 104 then continues monitoring the user. This embodiment is advantageous because it allows the user to review/learn his/her lines as if he/she was reading with the other cast members in a real-time environment.

In a further embodiment, the script presentation module 104 provides feedback to the user based on his/her performance. For example, a user may want to recite his/her lines from memory without seeing these lines in the interactive scripting environment 102. Therefore, in this embodiment, as the user is reciting his/her lines the script presentation module 104 monitors the words being spoken by the user and determines whether any mistakes have been made. For example, the script presentation module 104 analyzes the incoming audio data representing the user's voice and identifies each word being spoken. The script presentation module 104 identifies the set of lines being recited by the user and compares the user's words to the identified set of lines. The script presentation module 104 then determines if the user has correctly recited the lines or if the user has made a mistake. If the user has correctly recited the lines, the script presentation module 104 can notify the user using any type of visual, audible, and/or tactile mechanisms. For example, a sound, image, message, color, etc. can be displayed to the user to indicate a correct recitation. This notification, in one embodiment, can occur after a given line is read, after the entire scene is read, at an interval customized by the user, or the like.

The script presentation module 104 can also notify the user when a mistake has been made. For example, the script presentation module 104 can detect that the user has forgotten a word(s), recited a word(s) that is not within the current set of dialogue lines, etc. When a mistake is detected, the script presentation module 104 can notify the user using any type of visual, audible, and/or tactile mechanisms such as by displaying an, image, message, color, etc., playing a sound, generating tactile/haptic feedback, etc. This notification can be presented to the user when a mistake is detected, after the user has finished reciting the set of lines comprising the mistake, after the entire scene has been read, or at any other point in time.

In addition to notifying the user that a mistake has occurred, the script presentation module 104 can display or playback the correct word, words, or portion of the lines so that the user knows what should have been recited. Also, after the user has finished reading his/her set of lines, reading the entire scene, or the like, the user can be displayed annotations in the script 107 that identify the areas of the script 107 at which correct recitations and incorrect recitations were identified. Additionally, a report can be generated with this information as well.

Figure 8:
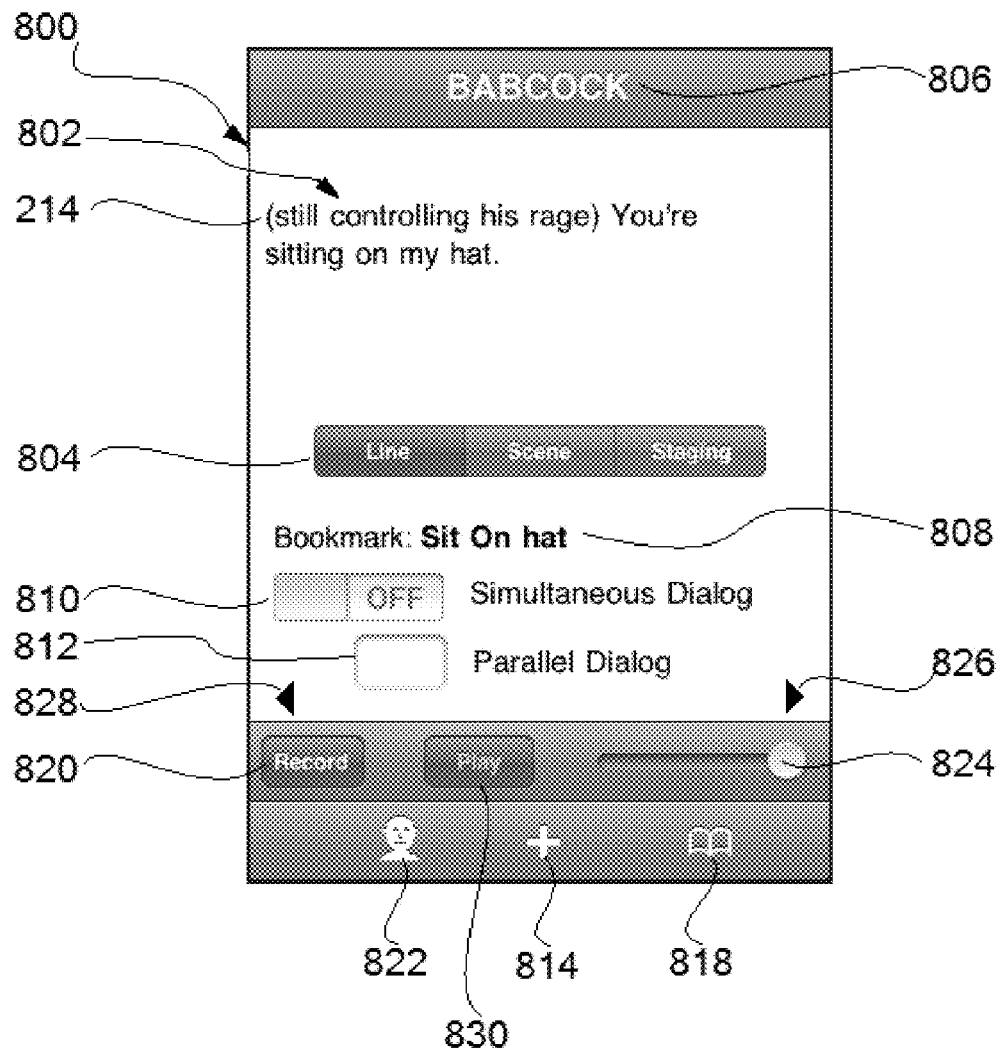
FIG. 8 shows an interactive script environment for editing one or more lines of a script according to one embodiment of the present invention.

As discussed above, the user can also edit the script 107 in various ways. FIG. 8 shows one example of a window 800 for allowing the user to edit a script 107. The editing process is managed by the script editing module 106 of the interactive script environment 102. In one embodiment, this editing environment allows the user to manually enter notes into the script at any location he/she desires. This allows the user to edit, modify, and/or annotate the information within script and to also add additional material to the script as well.

In one embodiment, the user is able to view and change all aspects of a line within this editing environment. In the example of FIG. 8, line 214 of the script 107 has been displayed in a first region 802 of the window 800. When the user selects this region 802 or the line itself 214, the user is able to modify the contents of the line 214. The line text can include markup language tags (e.g., hypertext markup language (HTML) tags) to allow additional formatting of the text when being played back. A second region 804 of the window 800 indicates what type of line is represented (Scene, Dialogue, Stage directions). The user can use a pointing/navigation device to change the line to the desired type. A third region 806 indicates what role is associated with this line 214. A fourth region 808 indicates the name of the bookmark associated with this line if such a bookmark exists. A fifth region 810 indicates whether this line is spoken at the same time as another line. The user is able to change this value. In one embodiment, when dialogue is identified as being spoken at the same time by two or more roles, the lines for these two or more roles can be presented together in one line.

A sixth region 812 indicates whether this line is spoken in parallel with another dialogue line. A numeric value is assigned to this region to indicate a parallel dialogue. All lines relating to the same logical conversation are given the same numeric value. However, other methods for indicating parallel dialogue are applicable as well. Upon selecting the role icon 822, a window is displayed showing a list of possible roles that the user can select for association the selected line 214. Selecting the add line icon 814 results in any changes made to the line information being saved and a new line being created. The bookmark icon 818 allows the user to add, change, or delete the bookmark associated with this line. When the record icon 820 is selected the audio interface 110 begins recording and allows the user to make an audio file 109 that is associated with this line 214. This audio file 109 is then available for playback when playing the script 107. The user is able to select the Next icon 826 to advance to the next line and make (or review) a recording. Alternatively, once the user has finished speaking during a recording the user can select the Next icon, which terminates the recording process and advances to the next line. The user can similarly select the Previous icon 828 to return to a previous live and make (or review) a recording. The play icon 830 audibly presents any audio file 109 associated with this line 214. The audio volume icon 824 allows the user to increase or decrease the audio volume by sliding the level indicator left or right.

Operational Flow Diagram

Figure 9:
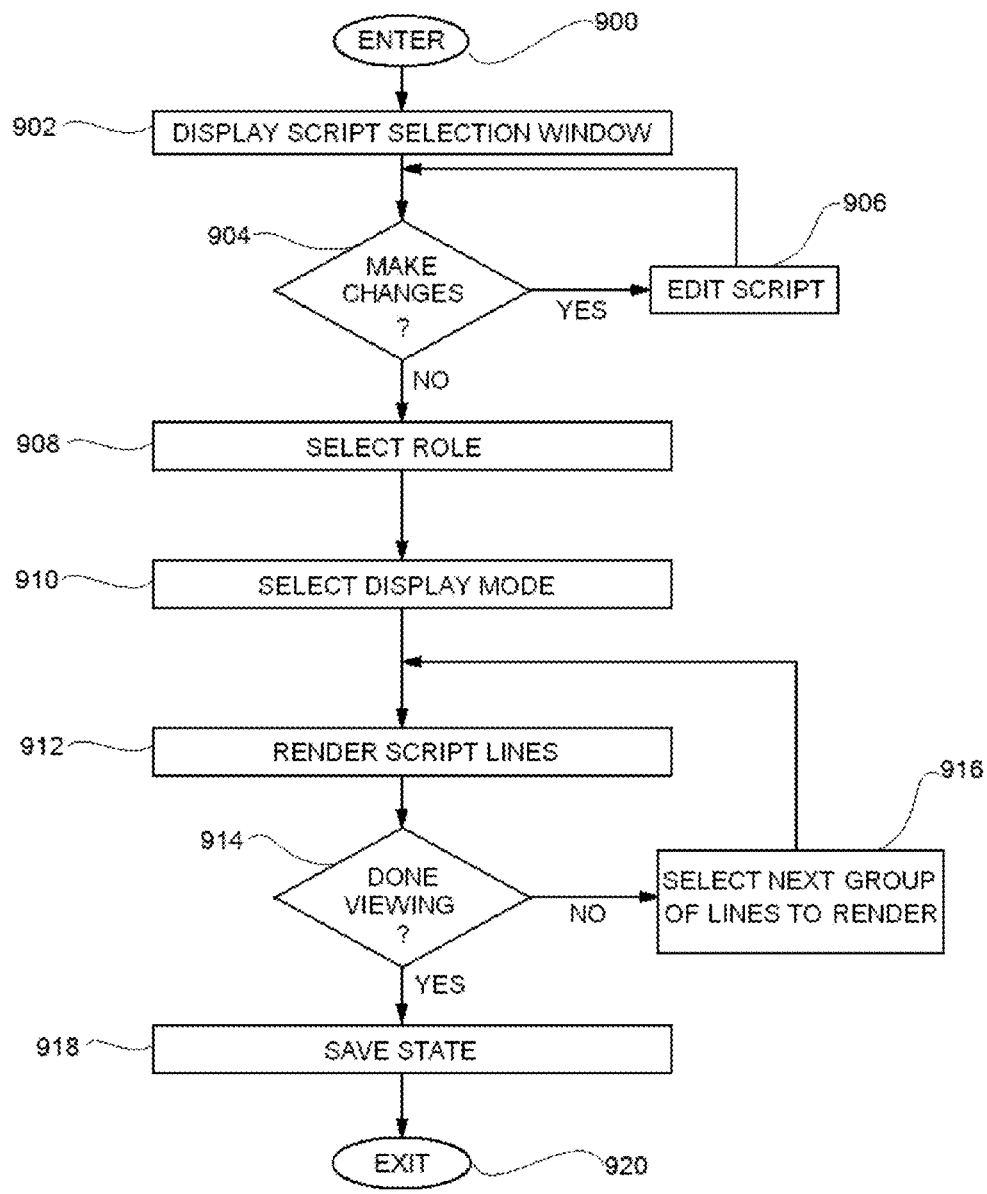
FIG. 9 is an operational flow diagram illustrating one example of a process for presenting a script to a user within an interactive script environment according to one embodiment of the present invention.

FIG. 9 is an operational flow diagram illustrating one example of presenting a script 107 to a user through an interactive script environment 102. The operational flow diagram of FIG. 9 begins at step 900 and flows directly to step 902. The script presentation module 104, at step 902, presents a window to the user comprising available scripts 107 available for selection. The script presentation module 104 displays a selected script 107 to the user via the user interface 108 of the user device 100. It should be noted that, in one embodiment, there is no predefined format of the script 107. However, certain information about the non-digital scripts can be encapsulated in the format, as discussed above with respect to FIG. 2. For example, information such as which lines are dialogue lines, the role associated with a dialogue line, After the script 107 has been loaded, the script presentation module 104, at step 904, determines whether the script 107 needs to be modified in any way. Here, the user can optionally request to edit the script 107 via the script editing module 106, thereby placing the interactive script environment 102 in an edit state. If the user has decided to make changes, an editing environment, at step 906, is presented to the user. For example, a window is presented to the user that provides facilities for changing characteristics of the script 107 by changing, adding, or removing lines therefrom. In addition, the user can optionally add bookmarks to the script 107 and add audio files/recordings 109 to the script 107 to be played back as a part of the presentation process.

When the user chooses not to make changes, or alternatively has completed his changes the script presentation module 104 places the environment 102 into a presentation state for presenting the script 107 to the user. The script presentation module 104, at step 908, receives the user's selection for a role that he/she wishes to study or learn. For example, the script presentation module 104 presents a selection window to the user that comprises a list of all the possible rolls (characters) in the script 107. The user selects one of these roles to be the active role in the presentation of the script 107. All other lines can be considered non-active. This active role is the part that the user is playing in the performing arts event. In some performing arts events the actor may play multiple roles. In this case the user is able to select more than one role at the same time to be considered the active role(s).

The script presentation module 104, at step 910, prompts the user to select a presentation mode for the script 107. As discussed above, there are at least four primary modes that can be rendered, Scene mode, Line mode, Role mode, and Redacted mode. Once the user selects the presentation mode, the script presentation module 104, at step 912, renders/presents the script lines appropriate for the selected mode on the user interface 108 of the user device 100. In one embodiment, the lines are displayed within a scrollable window allowing the user to view all the lines for that mode in the event that they are not all visible in the window. If audio is available for the lines being viewed, they can be played at this time as well.

The script presentation module 104, at step 914, determines if the user has completed viewing the script 107. If the user has not completed viewing the script 107, the script presentation module 104, at step 916, receives a selection from the user of another group of lines to view. The control flow then returns to step 912 to render/present these lines. A few examples of the options available to the user for selection are: 1) the next sequential group of lines, 2) the group of lines previously viewed, 3) a bookmark in the script that allows the user to jump to any place in the script that he/she has previously setup, 4) jump to the last bookmark previously selected, 5) change the active role, and 6) change to another display mode. Once the next group of lines is selected, the script presentation module 104 has as the current position the next individual line to be rendered/presented to the user. This current position is the first line of the next group of lines to render/present.

Once the script presentation module 104 has received an indication from the user that he/she has completed viewing the script 107 the script presentation module 104, at step state 918, saves the state of the interactive script environment 102. This state can include, but is not limited to, the script 107, active role, display mode, and the group of lines the user was viewing. This state can be used the next time the interactive script environment 102 is started so that the user does not need to reselect them. The control flow then exits at step 920.

Figure 10:
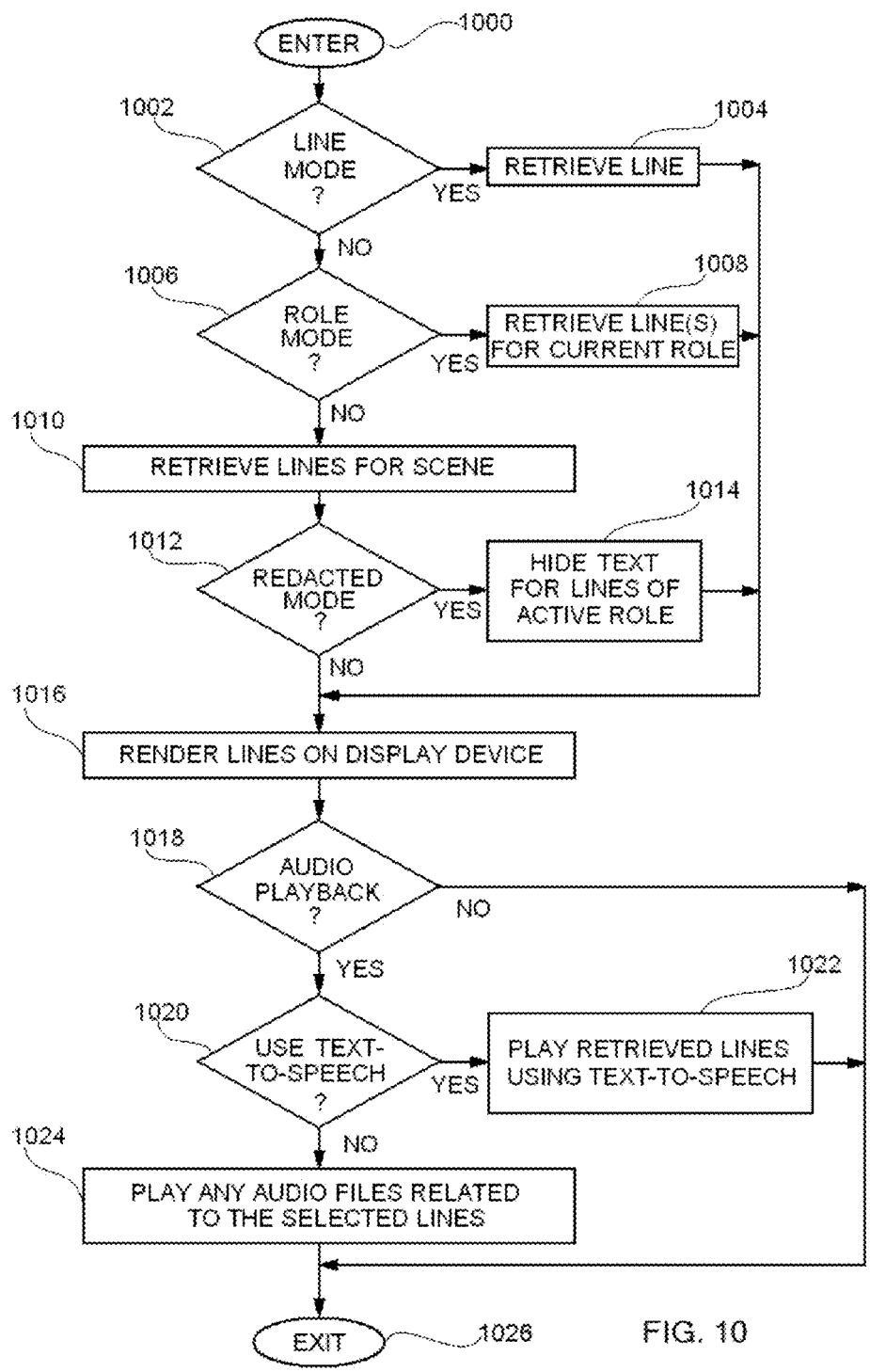
FIG. 10 is operational flow diagram illustrating one example of a more detailed process for presenting a script to a user within an interactive script environment according to one embodiment of the present invention.

FIG. 10 is an operational flow diagram illustrating a more detailed example of the line rendering step 912 of FIG. 9. The operational flow diagram of FIG. 10 beings at step 1000 and flows directly to step 1002. In rendering/presenting the lines of the script, the script presentation module 104 determines which lines to render/present. Therefore, the script presentation module 104, at step 1002, determines if the user has selected the Line mode. If so, the script presentation module 104, at step 1004, retrieves the line at the current position in the script 107 to be rendered/presented. The control then flows to step 1016. If the determination at step 1004 is negative, the script presentation module 104, at step 1006, determines if the user has selected the Role mode. If so, the script presentation module 104, at step 1008, retrieves the appropriate lines for the current role. If the current position in the script is dialogue for the active role, then the line at the current position of the script is retrieved, otherwise, all sequential lines from the current position to the line before the next dialogue line for the active role are retrieved. The control then flows to step 1016.

If the result of the determination at step 1006 is negative, the script presentation module 104 determines that either the Scene mode or the Redacted mode has been selected. Therefore, the script presentation module 104, at step 1010, retrieves all lines from the current position in the script 107 up to either, the line before the next Scene line, or the last line in the script 107, whichever comes first. If the script presentation module 104, at step 1012, determines that the user has selected Redacted mode, the script presentation module 104, at step 1014, modifies the lines for the Active role within the just retrieved lines in a manner (such as converting the characters to spaces) that makes the text un-readable. The script presentation manager 104, at step 1016, then renders/presents the retrieved lines to the user via the user interface 108.

The script presentation module 104, at step 1018, determines if the user has selected audio playback of a given set of lines in the script 107. If the user has selected to not use audio playback the control flow then exits at step 1026. The script presentation module 104, at step 1020, determines if the text-to-speech option has been selected. If so, the script presentation module 104, at step 1022, converts the lines just retrieved to audio via the TTS module and audibly presents these lines to the user via the audio interface 110. In one embodiment of the invention, only lines for the non-active role will be played on the audio device. However, any portion of the script 107 can be played. The control flow then exits at step 1026. If TTS has not been selected, the script presentation module 104, at step 1024, plays audio files corresponding to any of the lines in the lines just retrieved. The control flow then exits at step 1026.

Figure 11:
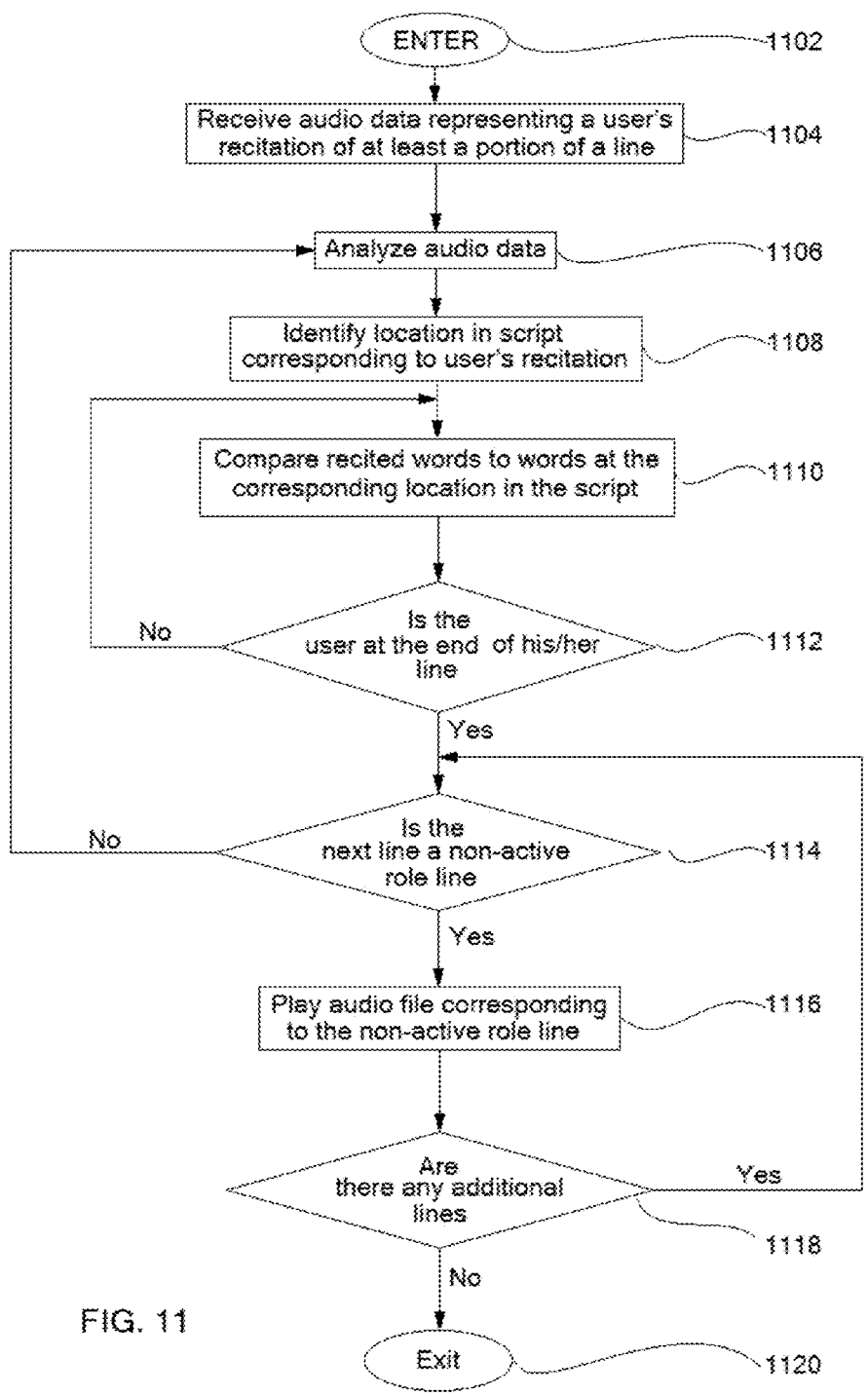
FIG. 11 is operational flow diagram illustrating one example of a process for providing a simulated reading partner for a script within an interactive script environment according to one embodiment of the present invention.

FIG. 11 is an operational flow diagram illustrating another example of providing an interactive script environment to a user. The operational flow diagram of FIG. 10 begins at step 1102 and flows directly to step 1104. The script presentation manager 104, at step 1104, receives audio data representing a user's recitation of at least a portion of line in a script 107. For example, the script presentation manager 104 can receive audio through a microphone that is receiving a user's spoken words. The script presentation manager 104, at step 1106, analyzes the audio data. The script presentation manager 104, at step 1108, identifies, based on the analyzing, a location in the script 107 corresponding to the user's recitation.

The script presentation manager 104, at step 1110, compares the words being recited by the user to the words at the identified location in the script 107. The script presentation manager 104, at step 1112, determines, based on the comparison, if the user has reached the end of his/her line. If the result of this determination is negative, the control flow returns to step 1110. If the result of this determination is positive, the script presentation manager 104, at step 1114, determines if the next line in the script 107 is a non-active role line.

If the result of this determination is negative, the script presentation manager 104 continues to analyze the audio data and compare the words recited by the user to words in the corresponding location in the scripts 107. If the result of this determination is positive, the script presentation manager 104, at step 1116, plays an audio file(s) 109 corresponding to the non-active role line. The script presentation manager 104, at step 1118, determines if there are any additional lines in the script, scene, etc. If the result of this determination is positive, the control flows to step 1114. If the result of this determination is negative, the control flow exits at step 1120. It should be noted that at the comparison step 1110, the script presentation manager can also determine if the user is correctly or incorrectly reciting his/her lines, as discussed above. Then the script presentation manager 104 is able to notify the user accordingly.

Information Processing System

Figure 12:
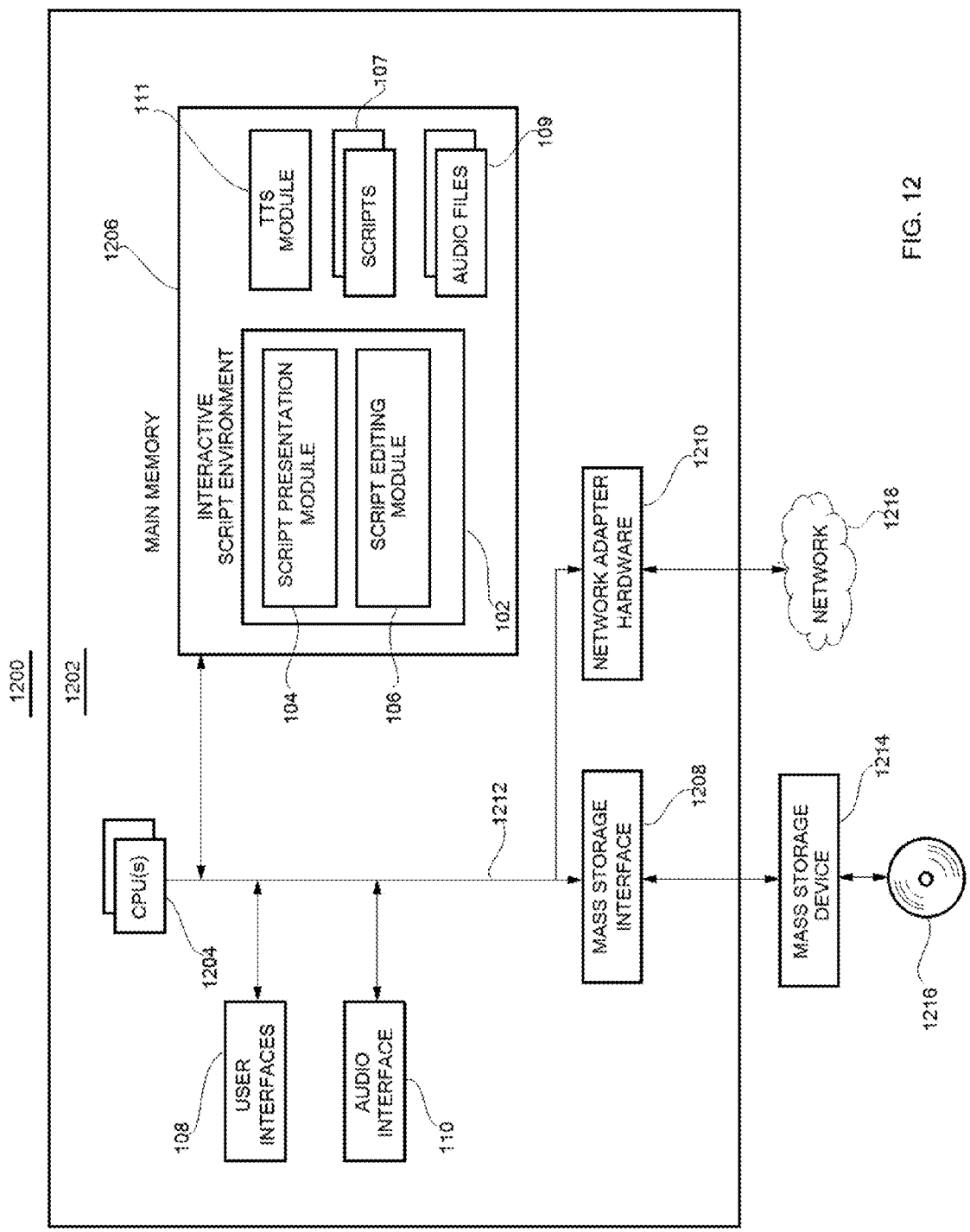
FIG. 12 is a block diagram illustrating a detailed view of an information processing system according to one embodiment of the present invention.

FIG. 12 is a block diagram illustrating a more detailed view of an information processing system 1200, such as the user device 100, which can be utilized in the operating environment discussed above with respect to FIG. 1. It should be noted that if the information processing system 1200 is a wireless communication device, wireless communication subsystems (not shown) can also be included in addition to the components discussed below.

The information processing system 1200, in one embodiment, is based upon a suitably configured processing system adapted to implement one or more embodiments of the present invention. Similarly, any suitably configured processing system can be used as the information processing system 1200 by embodiments of the present invention. The information processing system 1200 includes a computer 1202. The computer 1202 has a processor(s) 1204 that is connected to a main memory 1206, mass storage interface 1208, and network adapter hardware 1210. A system bus 1212 interconnects these system components. The main memory 1206, in one embodiment, comprises the interactive script environment 102 and its components as shown in FIG. 1, the scripts 107, audio files 109, and TTS module 111.

Although illustrated as concurrently resident in the main memory 1206, it is clear that respective components of the main memory 1206 are not required to be completely resident in the main memory 1206 at all times or even at the same time. In one embodiment, the information processing system 1200 utilizes conventional virtual addressing mechanisms to allow programs to behave as if they have access to a large, single storage entity, referred to herein as a computer system memory, instead of access to multiple, smaller storage entities such as the main memory 1206 and data storage device 1216. Note that the term "computer system memory" is used herein to generically refer to the entire virtual memory of the information processing system 1200.

The mass storage interface 1208 is used to connect mass storage devices, such as mass storage device 1214, to the information processing system 1200. One specific type of data storage device is an optical drive such as a CD/DVD drive, which may be used to store data to and read data from a computer readable medium or storage product such as (but not limited to) a CD/DVD 1216. Another type of data storage device is a data storage device configured to support, for example, NTFS type file system operations.

Although only one CPU 1204 is illustrated for computer 1202, computer systems with multiple CPUs can be used equally effectively. Embodiments of the present invention further incorporate interfaces that each includes separate, fully programmed microprocessors that are used to off-load processing from the CPU 1204. An operating system (not shown) included in the main memory is any suitable operating system such as, but not limited to, any of the Linux, UNIX, Windows, and Windows Server based operating systems. Handheld operating systems such as, but not limited to, iOS, Android, webOS, etc., are also applicable as well. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1200. The network adapter hardware 1210 is used to provide an interface to a network 1218. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 1216, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Aspects of the present invention were discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various example embodiments of the present invention have been discussed in the context of a fully functional computer system, those of ordinary skill in the art will appreciate that various embodiments can be embodied as a system, method, or computer program product and are capable of being distributed as a computer readable storage medium or a program product via CD or DVD, e.g. CD, CD-ROM, or other form of recordable media, and/or according to alternative embodiments via any type of electronic transmission mechanism. A computer program product can be embodied in one or more computer readable medium(s) having computer readable program code embodied thereon. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system."

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

What is claimed is:

1. A method for presenting a script to a user, the method comprising:
   presenting via a user interface of an electronic device a list of a plurality of character roles in a script;
   receiving from the user, using the user interface of the electronic device, a selection of one or more active character roles in a set of active and non-active character roles, each of the active character roles includes one or more of role names, dialogue, and stage directions associated therewith within the script;
   in response to receiving a selection from the user, visually altering an appearance by redacting the one or more lines of dialogue associated with the active character roles to distinguish these lines of dialog from the one or more lines of dialog associated with the non-active character roles;
   presenting via the user interface of the electronic device a list of a plurality of display modes for the script; and
   in response to receiving a display mode selection from the user of a role mode, presenting, on the user interface on a first screen of the electronic device, at least a portion of the script in which contiguous lines for the active character roles together on the user interface of the electronic device at a first time period and then presenting contiguous lines for the non-active character roles together on the user interface of a second screen separate from the first screen at a second time period thereby producing an alternating presentation sequence in time of the contiguous lines of the script for the active character roles followed by the contiguous lines of the script for the non-active character roles, wherein the non-active character roles comprise plurality of non-active character roles of the script and playing the non-active character roles using at least one of prerecorded audio and synthesized text-to-speech.

2. The method of claim 1, wherein the one or more lines of dialogue associated with the active character roles are highlighted.

3. The method of claim 1, wherein the role mode
displaying a set of sequential lines associated with the active character roles followed by alternately displaying a set sequential lines associated with non-active character roles.

4. The method of claim 1, further comprising:
audibly presenting at least a first set of dialogue within the portion of the script wherein the first set of dialogue is associated with at least one of the active character roles and the non-active character roles,
wherein the first set of dialogue is audibly presented utilizing at least one of an audio file associated with the first set of dialogue and a text-to-speech process.

5. The method of claim 4, further comprising:
monitoring a recitation, by the user, of at least a second set of dialogue within the at least a portion of the script;
determining, based on the monitoring, that the user has finished reciting the second set of dialogue; and
automatically and audibly presenting the first set of dialogue in response to determining that user has finished reciting the second set of dialogue.

6. The method of claim 1, further comprising:
displaying the portion of the script in an editable state;
receiving, in response to the portion of the script in an editable state being displayed in the editable state, a change to the portion of the script, from the user; and
presenting the portion of the script based on the change from the user.

7. The method of claim 2, wherein the one or more lines of dialogue associated with the active character roles are highlighted-along with the stage directions associated with the active character roles.

8. The method of claim 2, wherein the one or more lines of dialogue associated with the active character roles are to hidden by being highlighted.

9. An electronic device for presenting a script to a user, me electronic device comprising:
memory;
a processor communicatively coupled to the memory; and
an interactive script environment communicatively coupled to the memory and the processor, wherein the interactive script environment is configured to perform a method comprising:
presenting via a user interface of an electronic device a list of a plurality of character roles in a script;
receiving from the user, using the user interface of the electronic device, a selection of one or more active character roles in a set of active and non-active character roles, each of the active character roles includes one or more of role names, dialogue, and stage directions associated therewith within the script;
receiving from the user, using the user interface of the electronic device, a selection of one or in response to receiving a selection from the user, visually altering an appearance by redacting the one or more lines of dialogue associated with the active character roles to distinguish these lines of dialog from the one or more lines of dialog associated with the nonactive character roles;
presenting via the user interface of the electronic device a list of a plurality of display modes for the script; and
in response to receiving a display mode selection from the user of a role mode, presenting, on the user interface on a first screen of the electronic device, at least a portion of the script in which contiguous lines for the active character roles together on the user interface of the electronic device at a first time period and then presenting contiguous lines for the non-active character roles together on the user interface of a second screen separate from the first screen at a second time period thereby producing an alternating presentation sequence in time of the contiguous lines of the script for the active character roles followed by the contiguous lines of the script for the non-active character roles, wherein the non-active character roles comprise plurality of non-active character roles of the script and playing the non-active character roles using at least one of prerecorded audio and synthesized text-to-speech.

10. The electronic device of claim 9, wherein the one or more lines of dialogue associated with the active character roles are highlighted.

11. The electronic device of claim 9, further comprising:
audibly presenting at least a first set of dialogue within the portion of the script wherein the first set of dialogue is associated with at least one of the active character roles and the non-active character roles,
wherein the first set of dialogue is audibly presented utilizing at least one of an audio file associated with the first set of dialogue and a text-to-speech process.

12. The electronic device of claim 11, further comprising:
monitoring a recitation, by the user, of at least a second set of dialogue within the at least a portion of the script;
determining, based on the monitoring, that the user has finished reciting the second set of dialogue; and
automatically and audibly presenting the first set of dialogue in response to determining that user has finished reciting the second set of dialogue.

13. The electronic device of claim 9, further comprising:
displaying the portion of the script in an editable state;
receiving, in response to the portion of the script in an editable state being displayed in the editable state, a change to the portion of the script, from the user; and
presenting the portion of the script based on the change from the user.

14. The electronic device of claim 10, wherein the one or more lines of dialogue associated with the active character roles are highlighted-along with the stage directions associated with the active character roles.

15. The electronic device of claim 10, wherein the one or more lines of dialogue associated with the active character roles are to hidden by being highlighted.

16. A non-transitory computer program product for presenting a script to a user, the non-transitory computer program product comprising:
a storage medium readable by a processing circuit and storing instructions for execution by the processing circuit for performing a method comprising:
presenting via a user interface of an electronic device a list of a plurality of character roles in a script;
receiving from the user, using the user interface of the electronic device, a selection of one or more active character roles in a set of active and non-active character roles, each of the active character roles includes one or more of role names, dialogue, and stage directions associated therewith within the script;
in response to receiving a selection from the user, visually altering an appearance by redacting the one or more lines of dialogue associated with the active character roles to distinguish these lines of dialog from the one or more lines of dialog associated with the non-active character roles;
presenting via the user interface of the electronic device a list of a plurality of display modes for the script; and in response to receiving a display mode selection from the user of a role mode, presenting on the user interface on a first screen of the electronic device at least a portion of the script in which contiguous lines for the active character roles together on the user interface of the electronic device at a first time period and then presenting contiguous lines for the non-active character roles together on the user interface of a second screen separate from the first screen at a second time period thereby producing an alternating presentation sequence in time of the contiguous lines of the script for the active character roles followed by the contiguous lines of the script for the non-active character roles, wherein the non-active character roles comprise plurality of non-active character roles of the script and playing the non-active character roles using at least one of prerecorded audio and synthesized text-to-speech.

17. The non-transitory computer program product of claim 16, wherein the one or more lines of dialogue associated with the active character roles are highlighted.

* * * * *